April 8, 1941.   J. DUNGLER   2,237,341
CIRCUIT CONTROLLER FOR TENTERING MACHINES
Filed Aug. 31, 1938   2 Sheets-Sheet 1
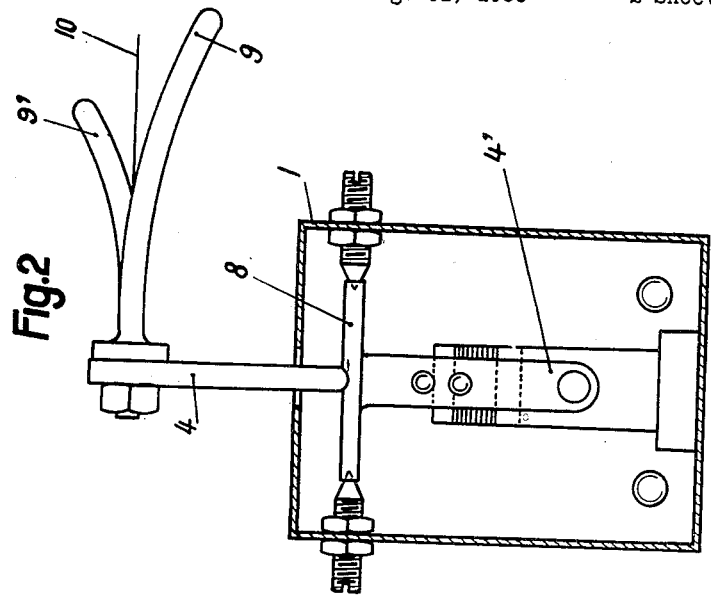
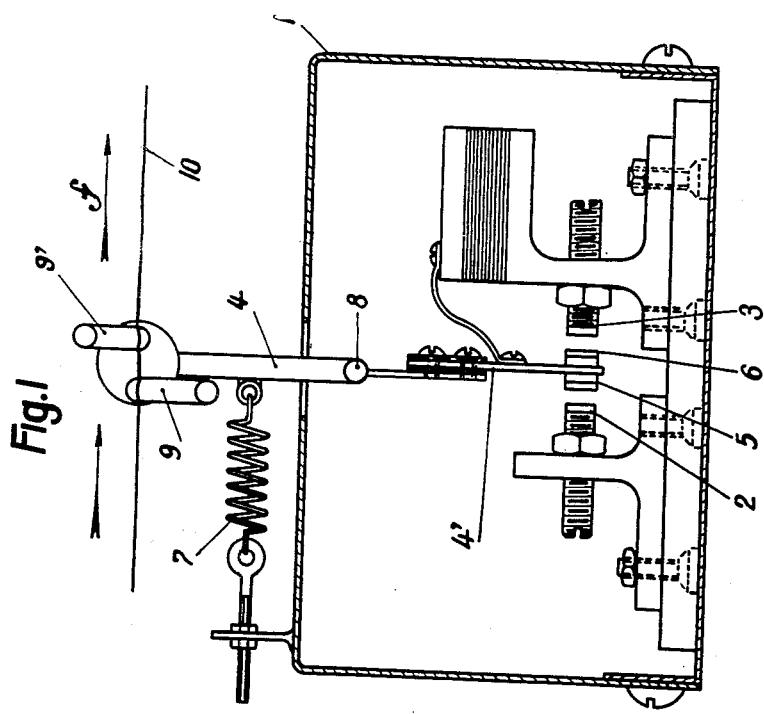
INVENTOR
JULIEN DUNGLER
BY Richards & Geier
ATTORNEYS April 8, 1941.  J. DUNGLER  2,237,341
CIRCUIT CONTROLLER FOR TENTERING MACHINES
Filed Aug. 31, 1938  2 Sheets-Sheet 2
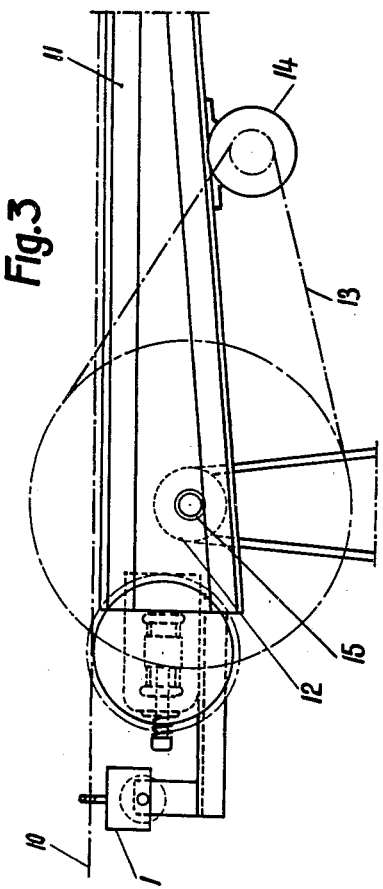
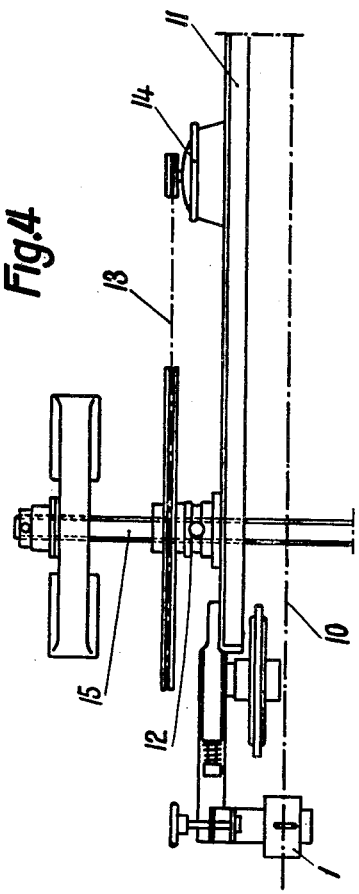
INVENTOR
JULIEN DUNGLER
BY
*Richards & Geier*
ATTORNEYS Patented Apr. 8, 1941

2,237,341

UNITED STATES PATENT OFFICE 2,237,341

CIRCUIT CONTROLLER FOR TENTERING MACHINES

Julien Dungler, Thann, France

Application August 31, 1938, Serial No. 227,659
In France September 1, 1937

1 Claim. (Cl. 200—52)

The invention relates to the electric contact breakers that are used for controlling the guiding of cloths, in particular on tentering and other machines for treating cloths "in the open width."

It is known that the automatic feeding apparatus which are mounted on tentering machines generally include, for each of the two selvedges, an electric contact breaker secured to a detector element, the position of which is dependent on that of the selvedge and which controls the movement of the corresponding tenter inlet plate according to whether the cloth deviates sideways from its regular course, or its width is modified.

It is also known that the known contact breakers are so arranged that the movable member, which carries the contacts and is secured to the detector element, moves in a plane perpendicular to the selvedge, that is to say in the direction of feed of the cloth, so that, in order to push back the movable member, the selvedge has to act with its edge on the detector. It is therefore indispensable for said selvedge to be properly stretched, otherwise it curls when it comes into contact with the detector without being able to overcome the force which holds the movable contact-carrier-member in a given position. This prevents the use of the automatic feed for delicate cloths, owing to the fact that they would not withstand the tensile stress required for giving the selvedge a sufficient tension to overcome the pressure of the movable contact-carrier-member.

Certain devices have been proposed which make use of photo-electric cells, or are provided with compressed air mechanisms, and which enable even slack selvedges to be guided, but such devices are complicated and very expensive.

The invention has for its object a simple and inexpensive construction of electric contact breakers, which are sufficiently sensitive to enable all cloths to be guided, even the most delicate, without danger of the selvedges curling, whatever may be their tension.

For this purpose, the object of the invention is an improvement which consists, in principle, in the fact that the movable contact-carrier-member, which is secured to the detector element on which the selvedge acts, is so mounted that it moves in a plane which is parallel or substantially parallel with said selvedge (that is to say in the direction of feed of the cloth) so that the selvedge displaces the detector element by means of the friction exerted by its surface on said detector element.

An embodiment of the invention is described hereinafter and diagrammatically illustrated, by way of example, in the accompanying drawings in which:

Fig. 1 is a sectional elevation, along a vertical plane parallel with the direction of feed of the cloth, of a contact-breaker constructed according to the invention;

Fig. 2 is a sectional elevation of same, along a vertical plane perpendicular to the direction of feed of the cloth.

Fig. 3 shows, in elevation, one of the tenter inlet plates with the contact breaker controlling same; and Fig. 4 is a plan view of Fig. 3.

According to these figures, 1 is the case of the contact breaker, inside which case are mounted two fixed contacts 2 and 3, between which can oscillate the end of a finger 4, 4' carrying contacts 5 and 6.

According to the invention, said finger 4, 4' is pivotally mounted about a spindle 8 which is arranged perpendicular to the direction of feed of the cloth, so that the oscillations of the finger 4, 4' are effected in a vertical plane which is parallel with the direction of feed $f$ of the cloth 10. It is subjected to the action of a spring 7 (or equivalent device) which, when the finger 4, 4' is not subjected to any other action, presses the movable contact 6 against the fixed contact 3. At its upper part, the finger 4, 4' carries the detector element which is formed for example, by a fork 9, 9' or simply by a rod which is bent like the lower arm 9 of the fork; the selvedge of the cloth 10 slips when it comes into contact with the lower arm 9 and it is therefore by the friction thus exerted by the selvedge that the finger 4, 4' is displaced.

At each selvedge of the cloth 10, is arranged a contact box 1 which controls the movements of the corresponding tenter-plate or tenter rail 11, in the example shown, said rail is secured to a nut 12 which is rotated, through the intermediary of a drive 13, by an electric motor 14. Although it is secured to the plate 11 which is displaced, the nut 12 can rotate freely so as to move along a screw 15, this movement adjusting the distance between the tenter feed plates.

The electric connection between the driving mechanism and the contact box 1 can either be made directly or preferably by means of a low tension electromagnetic relay.

The operation of the device can easily be imagined:

Assuming that contact breaker 1 is connected to the current supply, so long as the edge of the cloth 10 does not touch the fork 9, 9' forming the detector element, the spring 7 acting directly on the movable finger 4, 4' presses the contact 6 against the contact 3, which causes the tenter feed plate 11 to move inwardly, the motor 14 rotating in the required direction for this movement to take place.

When the machine is started and the selvedge of the cloth 10 touches the fork 9, 9', the surface of the selvedge exerts a friction action on the latter causing the finger 4, 4' to swing in the direction f of the feed of the cloth 10. If said friction remains small, owing to the fact that the cloth is fed normally, the finger 4, 4' remains in the neutral position shown in Fig. 1 and which corresponds to the stoppage of the motor 14. If, on the contrary, the friction increases owing to the fact that the cloth deviates sideways or that its width varies, the swinging of the finger 4, 4' in the direction f of feed of the cloth is accentuated, and the contact 5 is pressed against the contact 2. The motor 14 rotates in the opposite direction to the one previously considered and the tenter feed plate 11 in this case moves outwardly; of course, each of the tenter feed openings acts independently of the other.

Of course, the improved contact breakers according to the invention can be used for other purpose than for tenter feed plates; for example, they can be used for moving apart or together the electromagnetic selvedge-guide rollers which control the feed of cloth in machines for treating "in the open width." They can also be used for actuating feeding devices which operate by means of a vacuum, compressed air, or other fluid.

Of course, it is also understood that the invention is in no way limited to a particular embodiment and that without exceeding the scope of the invention, modifications and improvements of details can be imagined.

I claim:

In machines for treating cloth, a selvedge detecting apparatus actuating a device for automatically adjusting cloth guiding members in harmony with the lateral movement of the selvedges, said apparatus comprising a finger, a spindle pivotally supporting said finger in a plane perpendicular to the plane of the cloth, a detector element movable by the friction of the cloth in the direction of movement of said cloth, said detector element being connected with said finger and being situated on one side of said spindle, and contacts for electrically actuating said device, said contacts being carried by said finger and being situated on the other side of said spindle.

JULIEN DUNGLER.